United States Patent
Arms et al.

(10) Patent No.: US 6,499,368 B2
(45) Date of Patent: *Dec. 31, 2002

(54) MINIATURIZED PRESSURE EQUALIZED DISPLACEMENT SENSOR ASSEMBLY

(75) Inventors: Steven Willard Arms, Burlington, VT (US); Christopher Pruyn Townsend, Shelburne, VT (US); Steven Ward Mundell, Williston, VT (US)

(73) Assignee: Microstrain, Inc., Williston, VT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 87 days.

This patent is subject to a terminal disclaimer.

(21) Appl. No.: 09/067,710

(22) Filed: Apr. 28, 1998

(65) Prior Publication Data

US 2002/0117007 A1 Aug. 29, 2002

Related U.S. Application Data

(63) Continuation-in-part of application No. 08/590,835, filed on Jan. 17, 1996.
(60) Provisional application No. 60/045,034, filed on Apr. 28, 1997.

(51) Int. Cl.$^7$ ............... G01D 21/00; G01B 7/14; G01B 3/00
(52) U.S. Cl. ............... 73/866.15; 324/207.19; 33/556
(58) Field of Search ............ 324/207.12, 207.18, 324/19, 207.24, 207.17, 207.26; 92/5 R; 73/152.59, 866.51, 744; 137/553, 554; 33/556, 559

(56) References Cited

U.S. PATENT DOCUMENTS

| 4,261,203 A | * | 4/1981 | Snyder ................. 175/21 |
| 4,982,758 A | * | 1/1991 | Schlachter ........... 137/505.42 |
| 5,036,275 A | * | 7/1991 | Munch et al. ........ 324/207.17 |
| 5,146,784 A | * | 9/1992 | Maresca et al. ............ 73/313 |
| 5,216,364 A | * | 6/1993 | Ko et al. ............... 324/207.24 |
| 5,533,767 A | * | 7/1996 | Schnatzmeyer et al. ....... 137/1 |
| 5,642,043 A | * | 6/1997 | Ko et al. ............... 324/207.24 |
| 5,783,751 A | * | 7/1998 | Maw et al. .................. 73/761 |

* cited by examiner

*Primary Examiner*—Max Noori
(74) *Attorney, Agent, or Firm*—Thomas M. Neiman; James M. Leas

(57) ABSTRACT

The novel sensor assembly is comprised of a threaded housing with pressure relief tracks through the threads that terminate at a hole through the housing and a displacement sensor. In the preferred embodiment, we have included an integral connector, a super-elastic core carrier and a Differential Variable Reluctance Transducer. Other sensor types could be used to construct a pressure equalized displacement sensor as described herein, these may include: capacitive, resistive, Hall effect, eddy current, and differential variable transformer.

The sensor is attached to a keyed connector and the entire assembly is potted into the housing. A temperature probe can also be potted with this assembly to allow for multiple tasks tlo be performed by this one housing. The housing is threaded on one end to allow for easy mounting. A hole is drilled through the housing just in back of the sensor and two tracks run perpendicular to and slightly deeper than the threads. The tracks connect to the through hole. This configuration allows fluid to freely flow from the front to the back of the sensor and putting it in equilibrium without escaping from the pressurized environment. This embodiment is hermetically sealed, extremely robust and easily mounted.

39 Claims, 4 Drawing Sheets

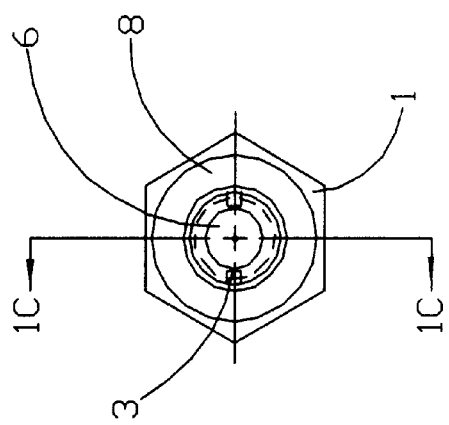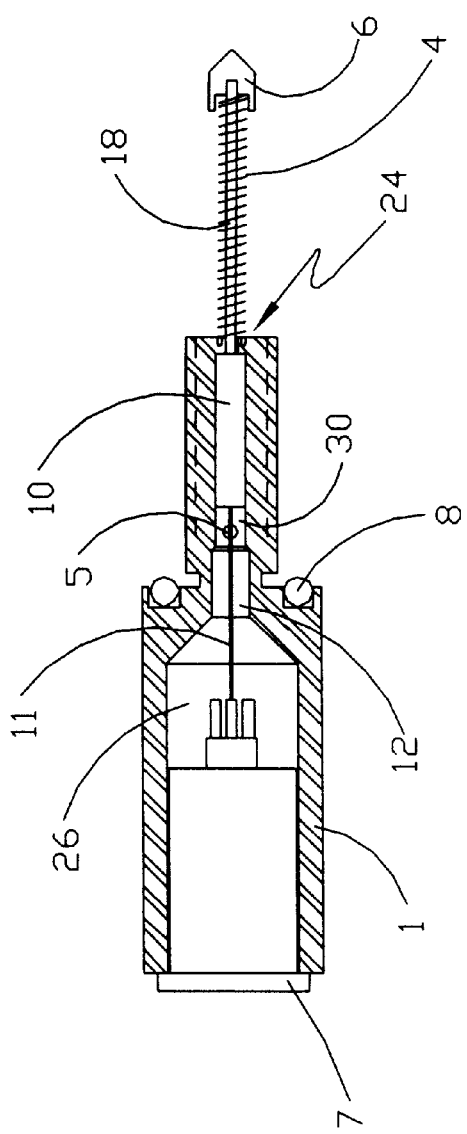

MINIATURIZED PRESSURE EQUALIZED DISPLACEMENT SENSOR ASSEMBLY

This is a continuation in part application based upon the utility application Ser. No. 08/590,835 filed on Jan. 17, 1996, and claims the benefit of Provisional application No. 60/045,034 filed Apr. 28, 1997.

BACKGROUND OF THE INVENTION

This invention pertains to devices for measuring displacement, and, in particular, to a differential variable reluctance transducer assembly for use in pressurized fluidic environments, and for use in hard to reach areas.

There have been a number of attempts to develop highly accurate miniaturized sensors to be used by industry to measure displacement, elongation, and strain. Examples of these type of devices include U.S. Pat. No. 4,813,435 issued to Steven W. Arms on Mar. 21, 1989, based on Hall Effect sensors. Other attempts in this area include the United States Patents issued to Robert W. Redlich, U.S. Pat. No. 4,667,158 issued on May 19, 1987 and to Alec H. Seilly, U.S. Pat. No. 4,350,954 issued on September 1982. There are, however many difficulties with those type devices. Among the difficulties are moisture problems, noise interference, core rotation artifact, and limited linear range, and restricted linear movement due to pressurized fluidic interference. Miniaturization of the sensor may also lead to fragility of sensor components, especially the tendency for transducer assembly to become bent or kinked.

What is needed for a miniature displacement measurement system is a small sliding core that is resistant to damage during handling, installation, and operation. Furthermore, when a sensor is installed in a fluidic environment, what is needed is a miniature transducer housing which will not allow leakage or seepage of fluid from the instrumented system into which the sensor is installed to the outside. This housing should also facilitate connection to external systems by an easily replaced cable assembly. This housing should also provide shielding from interference from stray external fields.

Furthermore, what is needed when a sensor is installed in a fluidic environment, is a transducer assembly which will not allow ingress of fluids into its sensing elements which could interfere with its normal operation. Finally, when a sensor is installed in a fluidic environment, what is needed is a pressure equalization method which provides a path for fluid, which results in an equalization of pressure within the measurement space, to allow free sliding of the displacement sensor's core.

It is the object of this invention to teach a linear displacement sensor assembly which avoids the disadvantages of and limitations of previous systems, and addresses the needs of linear position sensing in a fluidic environment. Another object of this invention is to provide a system which is easy to install, robust, effective, and efficient.

SUMMARY OF THE INVENTION

Particularly, it is the object of this invention to produce a miniaturized pressure equalized displacement sensor assembly, for use in, but not limited to use in, a pressurized or vacuum environment; and comprised of the following housing: said housing comprising a threaded end and a tightening means; said threaded end having tracks for fluid flow that connect to a hole through the housing at the back of a sensor; said sensor being mounted in a aperture within said threaded end; said sensor being connected to said through hole to allow access for said fluid to the back side of said sensor; said tightening means includes a sealing surface to stop the flow of any said fluid to the outside environment; said tightening means further comprising an aperture for a connector; said connector being attached to said sensor by way of lead wires or flexible tape circuitry; said housing being hermetically sealed by way of epoxy or insert molding.

BRIEF DESCRIPTION OF THE DRAWINGS

Further objects and features of this invention will become more apparent by reference to the following description taken in conjunction with the following figures, in which:

FIG. 1b is an end view of the Miniaturized Pressure Equalized displacement Sensor Assembly;

FIG. 1c is a cross sectional view thereof taken along line 1c—1c of FIG. 1b;

DETAILED DESCRIPTION OF THE PREFERRED EMBODIMENT

Figure 1A:
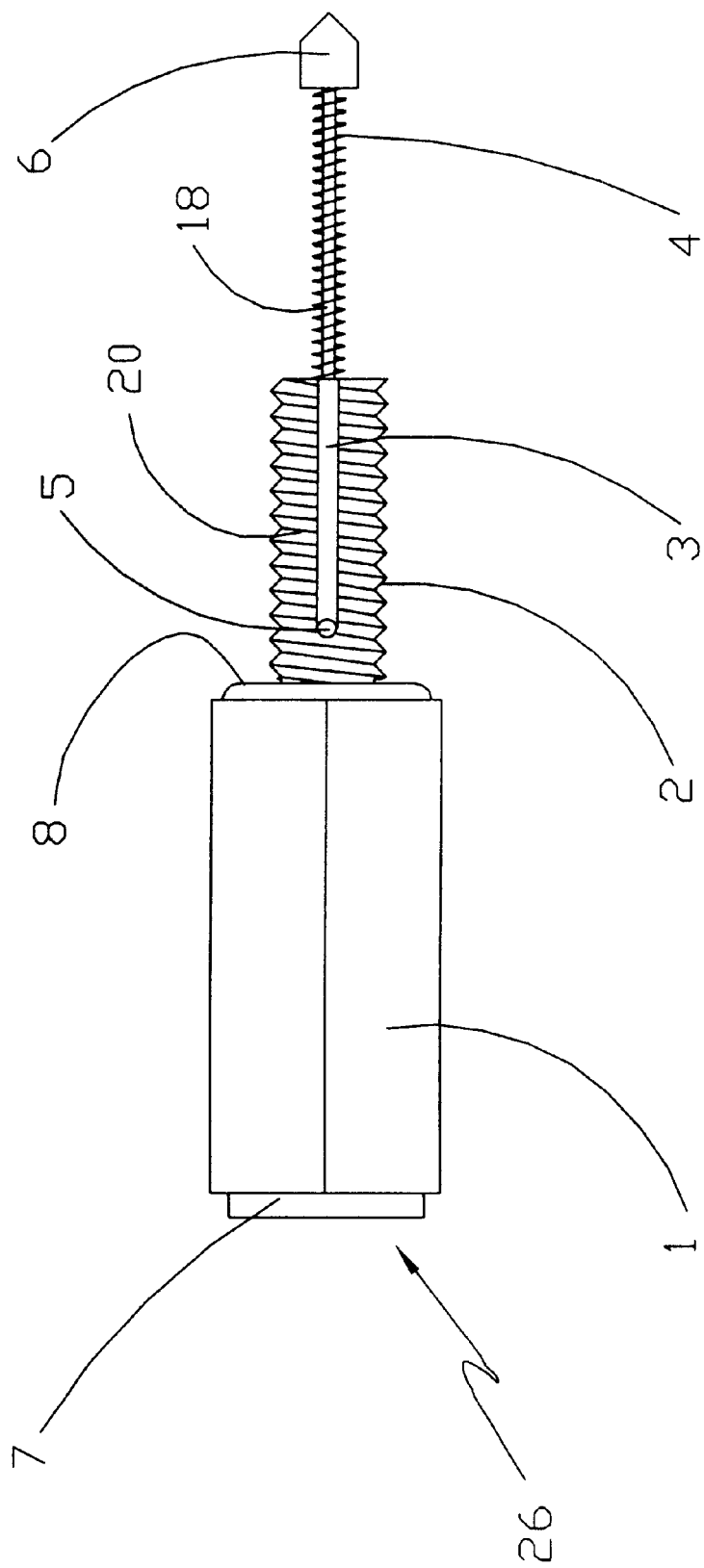
FIG. 1a is a solid view of the Miniaturized Pressure Equalized displacement Sensor Assembly.

FIG. 1 is a drawing of the novel Miniaturized pressure equalized Displacement Sensor Assembly. A displacement sensor, by way of example, a MicroStrain DVRT (U.S. Pat. No. 4,813,435)(10) is inserted into a housing (1). The housing may be constructed of polymeric or metallic materials, however, 400 series stainless steel is preferred for corrosion resistance and for improved immunity to external magnetic fields. The housing 1 has a shaft which is threaded with a plurality of threads 20 on one end (2) and includes, but not limited to , a hex head for secure tightening of the transducer into a threaded receptacle. The housing 1 has a plurality of apertures 5, 24, 26 to allow the insertion of the displacement sensor 10 and its connector 7. The threaded end of the housing 1 has an additional aperture (5) which allows the pressure at the back of the sensor (10) to be equalized with the pressure exerted on the core (9). Two tracks or channels (3) through threads 20 on either side allow the pressurized fluid or gas to free flow to and from the pressure relief holes (5), as shown in FIG. 1a and in FIG. 1b. The metal housing 1 also has an integral connector (7). This connector (7) may be attached to the sensor (10) by lead wires or polyamide flexible tape circuitry (11). The aperture 26 behind the pressure relief holes (5) is sealed with epoxy and half moon structures (12). Sealing is made easier to accomplish by using the two half moon shaped sealant rods (12); they are used to help slow the flow of epoxy out of the unit through the pressure relief holes prior to the cure of the epoxy. The epoxy and half moon construction may be eliminated by utilization of insert molding techniques. However, the epoxy seal is well suited for low volume production.

Figure 2:
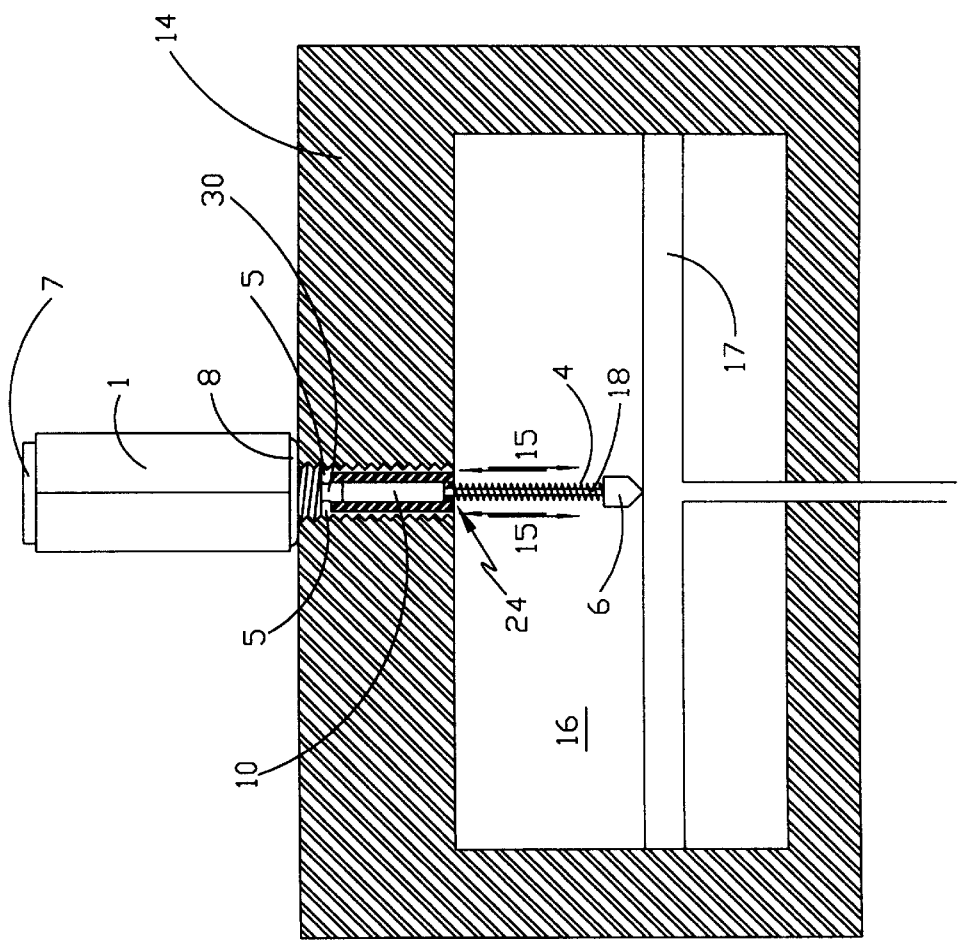
FIG. 2 shows the Miniaturized Pressure equalized Displacement sensor Assembly in one application.

An O-ring (8) is used to prevent leakage around the outside of the cylinder 14, as shown in FIG. 2. The material of the 0-ring may be changed depending upon the application environment that it is being used in. a spring (4) and a spring tip (6) are optional, and can allow for easier installation and/or force measurement capability.

Figure 3:
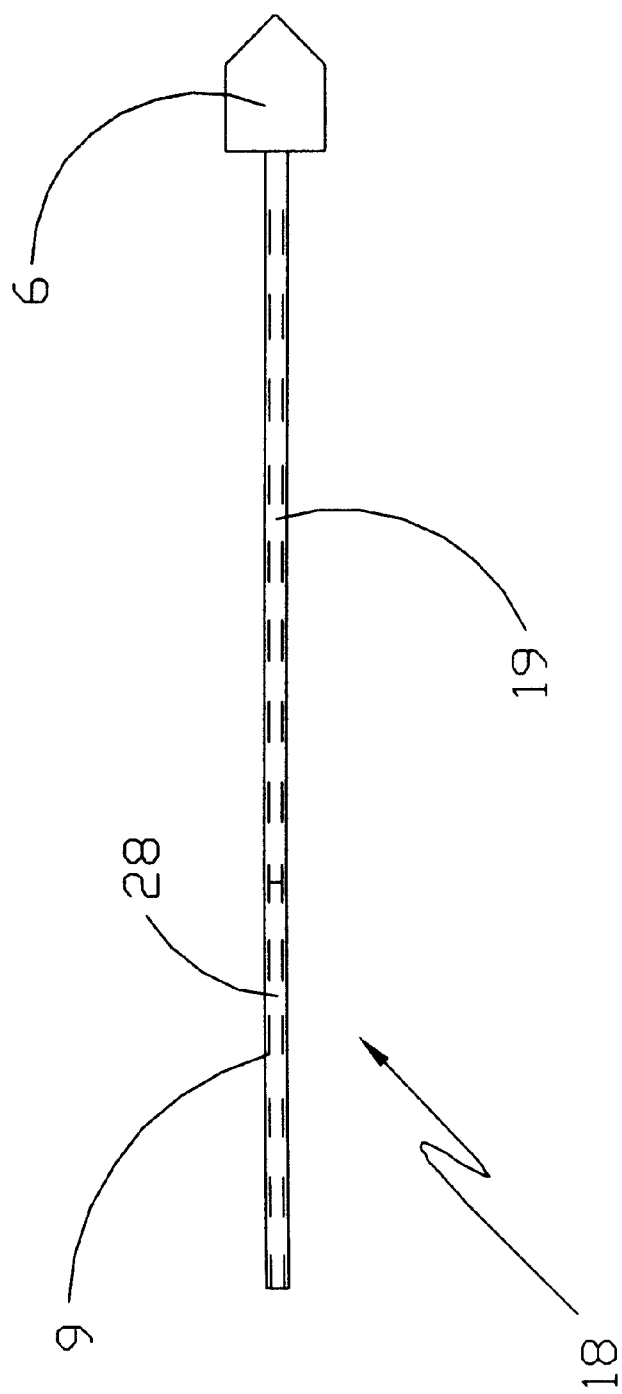
FIG. 3 shows the Nitinol core carrier and the components thereof.

The slideable core 18, is inserted into the sensor (10), but can slide freely within sensor (10), as shown in FIGS. 1a, 1c, and 2,. The slideable core (18) is comprised of a magnetically permeable metallic center bonded within a core carrier tube or circumference (9) which is comprised of a super elastic material such as a Nickel-Titanium Alloy, as shown in FIG. 3. The slideable core (18) can also be constructed of a conductive material. A reinforcement rod (19) comprised of a super elastic wire is fixed within the Nickel-Titanium circumference (9) and is totally nonmagnetic. Attached to the reinforcement rod (19) side of the core carrier tube (9) is an optional spring 4 and spring tip/entrapment (6).

A typical application and function of the Miniaturized Pressure Equalized Displacement Sensor assembly is depicted in FIG. 2. The housing 1 is threaded into a pressurized or vacuum environment, such as cylinder (14). The cylinder (14) contains a pressurized/vacuumed liquid/gas (16). This liquid is able to flow freely (15) to the back of the sensor to equalize the force exerted onto the core (9). This prevents pressurized liquid/gas from becoming trapped within the space 30 at the back of the sensor (10); therefore providing accurate, unimpeded displacement measurement of the piston (17).

We claim:

1. A sensor for mounting in a system, comprising:
    a sensing device and a housing, said sensing device having a first side and a second side, an aperture in said housing, said sensing device mounted within said aperture;
    a first opening in said housing exposing said first side to an environment outside said housing;
    a second opening in said housing exposing said second side to said environment outside said housing, wherein said first opening and said second opening provide that pressure on said first side is equal to pressure on said second side of said sensing device; and
    said housing further comprising a surface for sealably connecting said housing to the system, said sealing surface to stop fluid flow across said surface.

2. The sensor according to claim 1, wherein said sensing device comprises a differential variable reluctance transducer.

3. The sensor according to claim 1, wherein said sensing device further comprises a super-elastic core carrier.

4. The sensor according to claim 1, wherein said sensing device comprises an electrical connector.

5. The sensor according to claim 1, wherein said housing comprises a hermetic seal.

6. The sensor according to claim 1, wherein said sealing surface comprises a polymer O-ring.

7. The sensor according to claim 1, wherein said sensing device further comprises a spring.

8. The sensor according to claim 1, wherein said sensing device is for measuring displacement.

9. The sensor according to claim 1, wherein said housing comprises an approximately cylindrical unit.

10. The sensor according to claim 1, wherein said first opening comprises said aperture.

11. The device as recited in claim 1, wherein said first opening comprises a hole in said housing.

12. The device as recited in claim 11, wherein said housing comprises an axis and said hole extends along said axis.

13. The sensor according to claim 1, wherein said fastening member comprises a threaded surface.

14. A threaded member, comprising:
    a shaft having a threaded surface and an end surface;
    an aperture within said shaft;
    a first opening extending from said end surface to said aperture;
    a channel extending along said shaft from said end surface and intersecting a plurality of threads of said threaded surface; and
    a second opening extending from said channel to said aperture.

15. Threaded member as recited in claim 14, wherein said first opening comprises said aperture.

16. The device as recited in claim 1, wherein said housing comprises stainless steel.

17. The device as recited in claim 1, further comprising a material to seal said sensing device within said housing.

18. The device as recited in claim 1, further comprising a connector to said sensing device.

19. The device as recited in claim 1, wherein said sensing device comprises a displacement sensor.

20. The device as recited in claim 19, wherein said displacement sensor comprises a core carrier tube that can slide freely within said displacement sensor.

21. The device as recited in claim 20, wherein said core carrier tube comprises a magnetically permeable metallic center.

22. The device as recited in claim 20, wherein said core carrier tube comprises a super-eleastic material.

23. A system, comprising:
    a chamber and a sensor for sensing a parameter in said chamber;
    said sensor comprising a sensing device and a housing, said sensing device having a first side and a second side, an aperture in said housing, said sensing device mounted within said aperture;
    a first opening in said housing exposing said first side to an environment outside said housing;
    a second opening in said housing exposing said second side to said environment outside said housing wherein said first opening and said second opening provide that pressure on said first side is equal to pressure on said second side of said sensing device; and
    said housing further comprising a surface for sealably connecting said housing to said chamber, said sealing surface to stop fluid flow across said surface.

24. The device as recited in claim 23, wherein said chamber comprises a cylinder.

25. The device as recited in claim 23, wherein said chamber contains a pressurized liquid or gas.

26. The device as recited in claim 25, wherein pressurized liquid or gas can flow freely to said location through said second opening to equalize pressure.

27. The device as recited in claim 23, wherein said sensing device comprises a displacement sensor.

28. The device as recited in claim 27, wherein said displacement sensor comprises a differential variable reluctance transducer.

29. The device as recited in claim 23, wherein said sensing device comprises a connector.

30. The device as recited in claim 23, wherein said sensor is sealed to said chamber.

31. The device as recited in claim 23, wherein said sensing device comprises a spring.

32. The device as recited in claim 13, wherein said second opening comprises a track extending across threads of said threaded surface.

33. The device as recited in claim 13, wherein said housing further comprises a hex head for secure tightening said threaded surface into another threaded surface.

34. The device as recited in claim 32, wherein said second opening further comprises a hole extending from said track to said location.

35. A threaded member as recited in claim 14, wherein a sensor is located within said aperture.

36. A threaded member as recited in claim 14, wherein said shaft comprises an axis and wherein said first opening extends parallel to said axis.

37. A threaded member as recited in claim 36, wherein said first opening extends along said axis.

38. A threaded member as recited in claim 36, wherein said second opening extends perpendicular to said axis.

39. The sensor according to claim 32, wherein said second opening further comprises a hole extending from said track to a location along said aperture that is beyond said sensing device.

* * * * *